United States Patent [19]

Hardesty et al.

[11] Patent Number: 4,536,939
[45] Date of Patent: Aug. 27, 1985

[54] TOOL FOR TERMINATING TELEPHONE CORDAGE WITH MODULAR PLUGS

[75] Inventors: Edwin C. Hardesty, Perry Hall; Ronald C. Hardesty, Sykesville, both of Md.

[73] Assignee: AT&T Technologies, Inc., Berkeley Heights, N.J.

[21] Appl. No.: 442,929

[22] Filed: Nov. 19, 1982

[51] Int. Cl.³ .............................................. B25B 25/00
[52] U.S. Cl. ...................................... 29/566.4; 7/131; 29/751; 29/759
[58] Field of Search ...................... 29/564.1, 566, 566.1, 29/566.3, 33 M, 748, 749-751, 753, 759, 566.4; 7/131, 133, 158, 130

[56] References Cited

U.S. PATENT DOCUMENTS

| | | | |
|---|---|---|---|
| 2,784,621 | 3/1957 | Klinger | 7/133 X |
| 2,953,185 | 9/1960 | Lazar | 7/130 X |
| 3,654,647 | 4/1972 | Neff | 7/5.3 |
| 3,792,101 | 8/1976 | Casey et al. | 29/749 |
| 4,007,534 | 2/1977 | Tucci | 29/748 X |
| 4,028,756 | 6/1977 | Couto | 7/130 X |
| 4,043,174 | 8/1977 | Paolino | 72/412 |
| 4,160,317 | 7/1979 | Sergeant | 29/759 X |
| 4,178,675 | 12/1979 | Phillips | 29/566.1 |
| 4,387,501 | 6/1983 | Rix | 29/33 M X |
| 4,400,874 | 8/1983 | Craver | 29/748 |
| 4,409,713 | 10/1983 | Johnston | 29/33 M |
| 4,429,451 | 2/1984 | Angelico | 29/751 X |

OTHER PUBLICATIONS

Western Electric Technical Digest No. 53, Jan. 1979, "Hand Assembly Tool for Modular Plugs", Miller et al., p. 15.

Primary Examiner—William R. Briggs
Assistant Examiner—Glenn L. Webb
Attorney, Agent, or Firm—E. W. Somers

[57] ABSTRACT

A tool (20) is provided for terminating an end of a telephone cord or inside wiring with a modular plug (21). The tool includes a housing (81) having a cord or inside wiring-receiving opening at one of its ends and a plug-receiving nest (122) at an opposite end. The tool also includes a rocker (82) which is mounted pivotally in the housing and which has a first end adjacent to the cord-receiving end of the housing and a second end adjacent to the nest. After and end portion of a cord, for example, is inserted into the cord-receiving end of the housing, a user depresses the adjacent first end of the rocker to cause jacket-stripping facilities of the rocker to cut the cord jacket. When the cord is withdrawn, the jacket is removed from the end portion to expose individually insulated conductors. Then the end portion of the cord is inserted into a modular plug body which has been armed with blade-like terminals (30-30) and the plug inserted into the nest at the other end of the housing. The second end of the rocker is moved to cause portions of the rocker to seat fully the terminals in the plug body to engage electrically the insulated conductors. During the same motion of the rocker, strain relief portions of the plug body are moved into engagement with the jacket and the cord conductors to secure the plug body to the cord.

4 Claims, 17 Drawing Figures

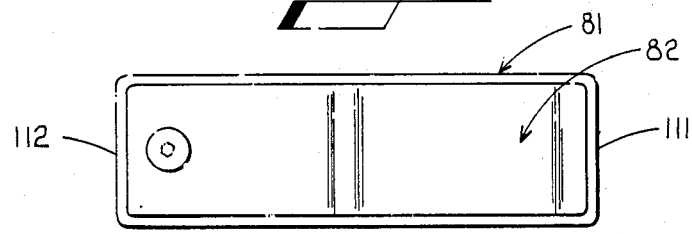
Fig_5
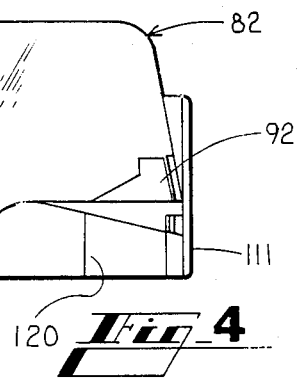
Fig_4
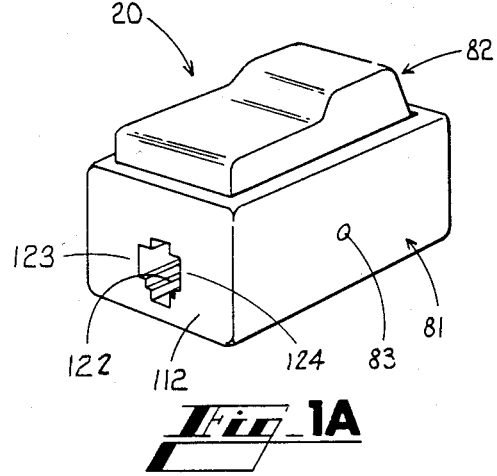
Fig_1A
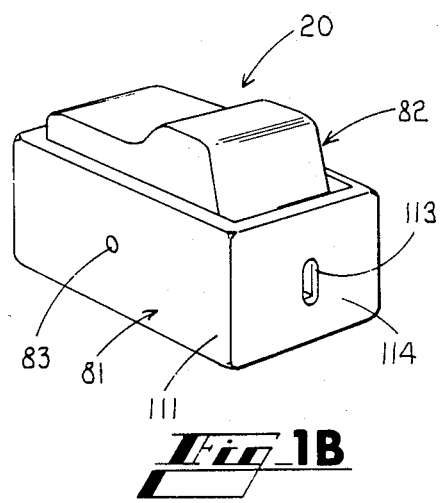
Fig_1B

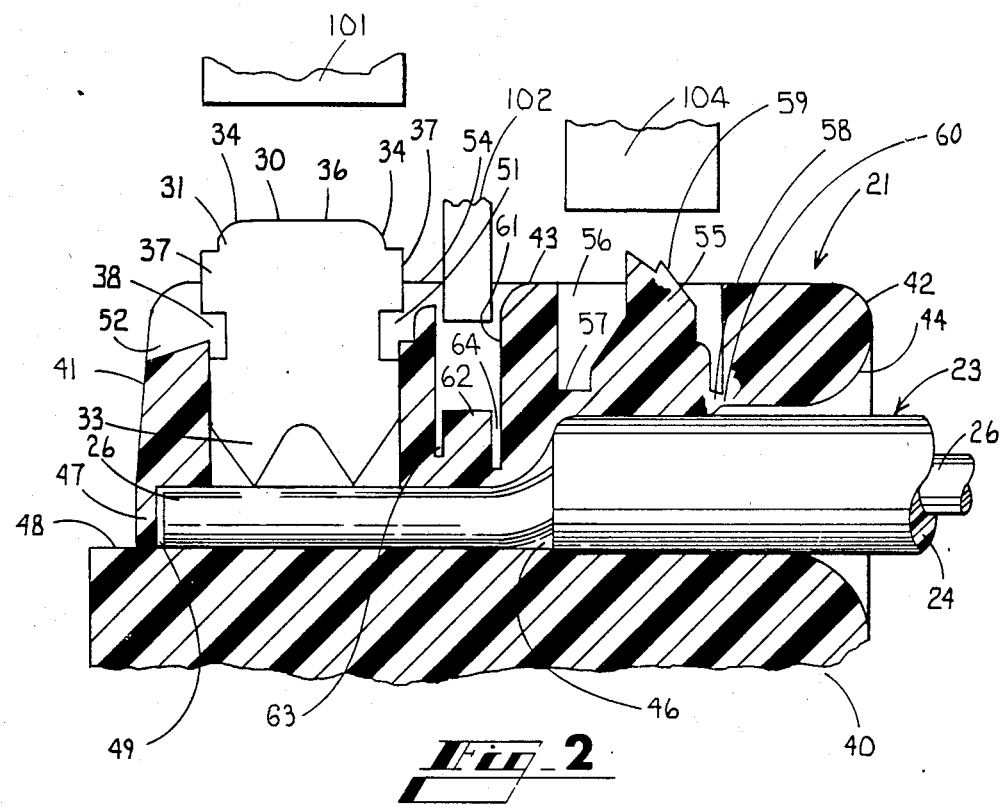
Fig_2
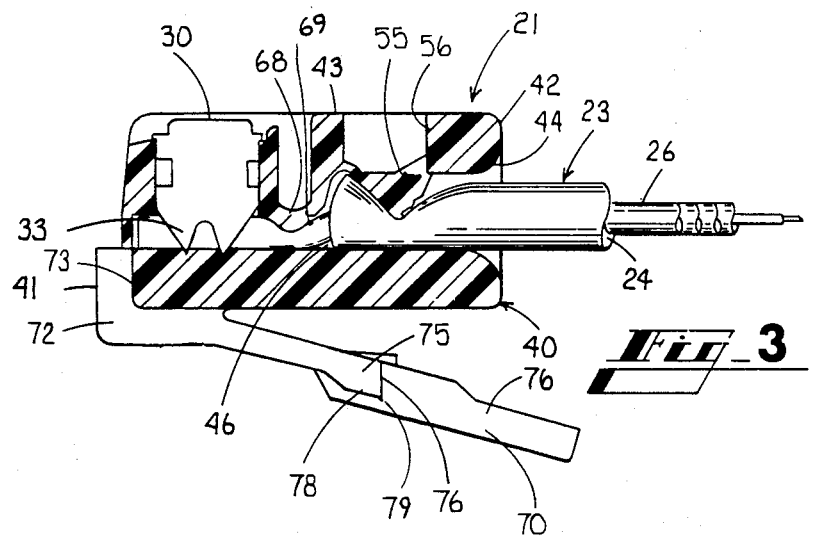
Fig_3

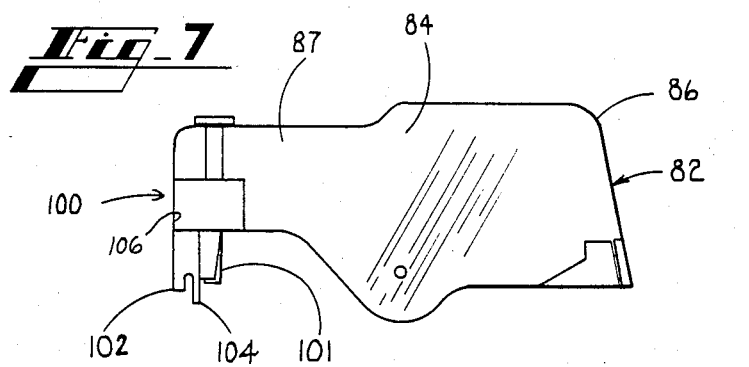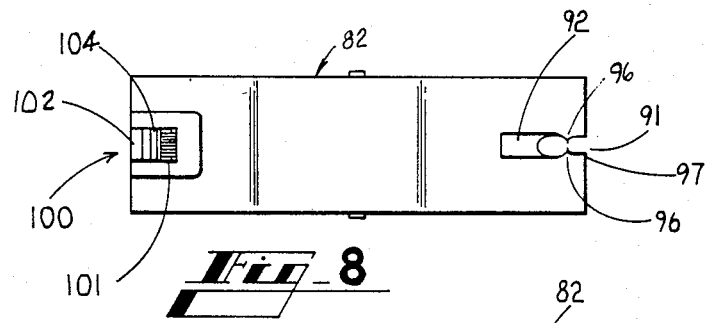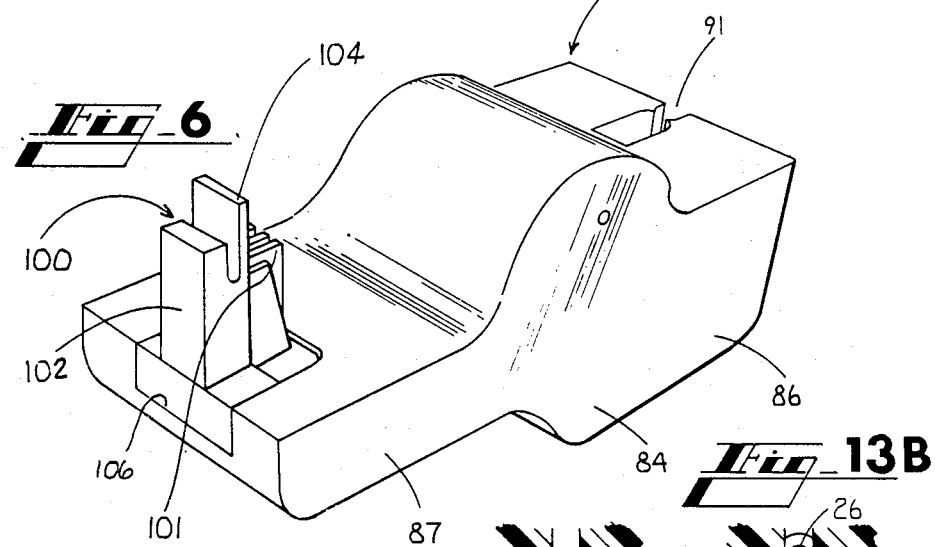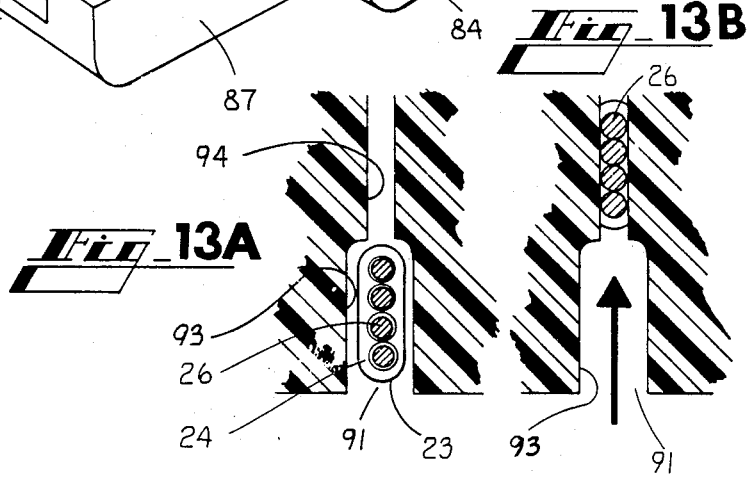

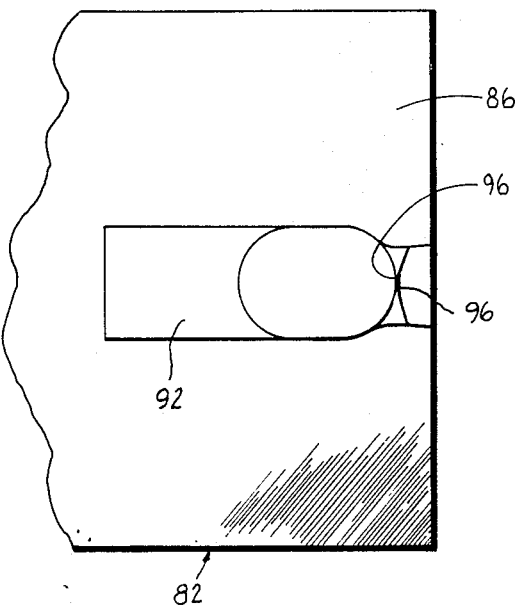
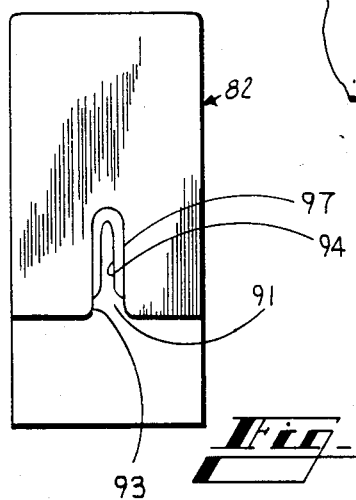
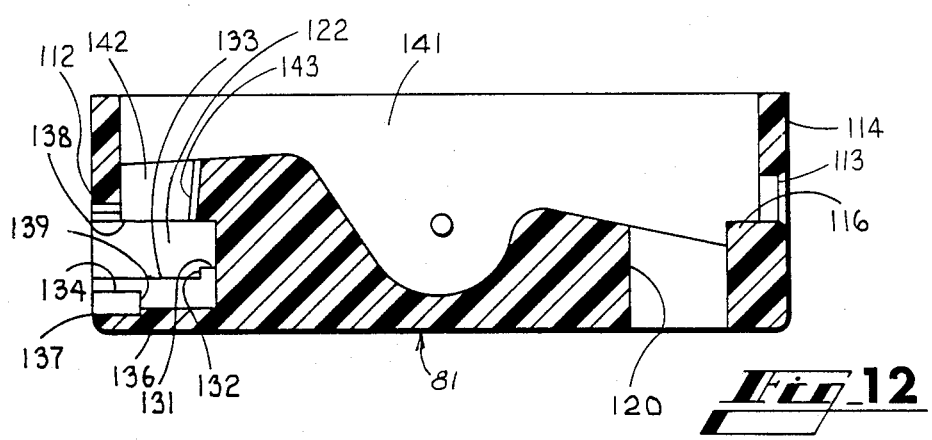

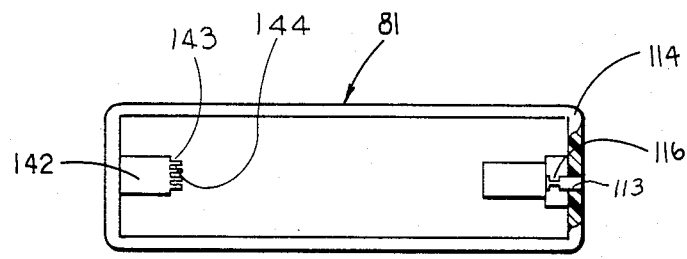
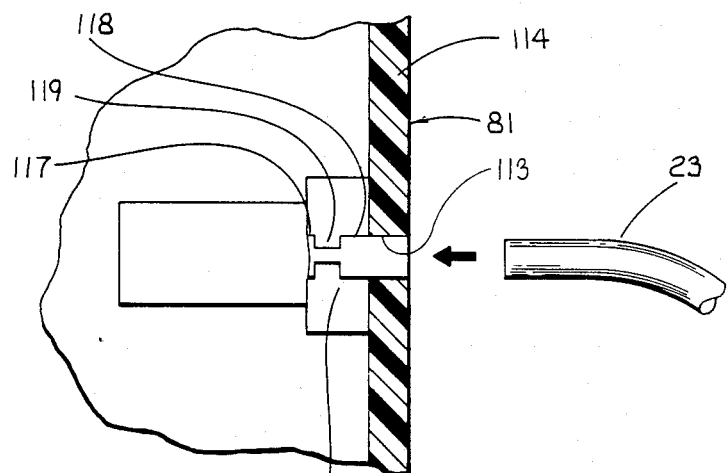
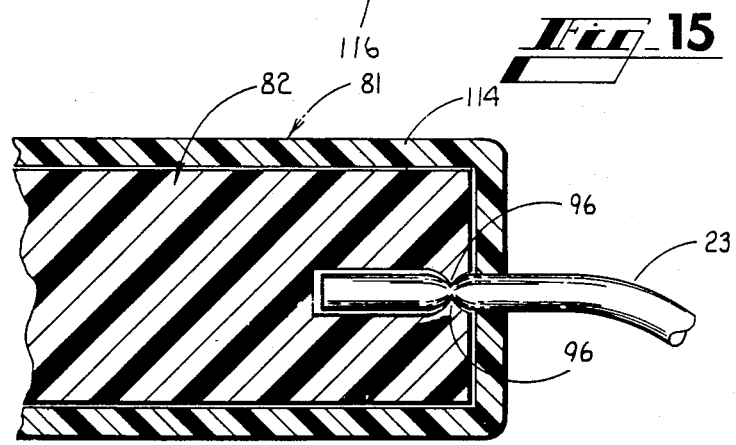

TOOL FOR TERMINATING TELEPHONE CORDAGE WITH MODULAR PLUGS

TECHNICAL FIELD

This invention relates to a tool for terminating telephone cordage with modular plugs, and, more particularly, to a hand tool which is capable of being used to terminate cordage extending to customer telephone equipment, as well as inside wiring, with modular plugs.

BACKGROUND OF THE INVENTION

Modularity is widely used in telephone communication systems. In a modular system, a modular plug which terminates an end of a telephone cord is inserted into a cavity of a modular jack which is mounted in a wall outlet or in portions of customer station equipment. Typically, a home is equipped with any of number of wall outlets, each of which includes a modular jack. This allows the customer to move a telephone from room to room and allows the customer to purchase and install new telephones and new cords as desired.

A typical home telephone wiring system includes a network interface device and a plurality of wire junction devices and wall outlets distributed about the rooms of a home. Inside wiring which includes a relatively small number of insulated conductors enclosed in a plastic jacket is run from a wire junction device which is fed from the interface to a plurality of wall outlets. Wiring also may be run from the entry wire junction device to another wire junction device to which additional wall outlets are connected. Typically the plastic jacket must be removed from each end of a length of inside wiring to permit connections of the conductors to the wire junction devices and wall outlets.

There has been a desire to improve the just-described system to simplify the wiring and to provide a modular wiring system. A tricoupler such as that disclosed and claimed in copending application Ser. No. 442,931, now U.S. Pat. No. 4,477,141, which was filed on even date herewith in the name of E. C. Hardesty, may be used to implement such a modular wiring system. It may be installed within or on the outside of walls in order to provide the customer with the capability of connecting to inside wiring as well as to customer station equipment.

There also has been a long felt need to provide a tool which may be used easily by the customer in order to connect modular plugs to telephone cords or to connect plugs to inside wiring which may be run within the walls or along the baseboard moldings of rooms. Such a tool would improve the versatility of the modular system which includes the above-mentioned tricoupler and provide the customer with the capability for easily making those connections which he chooses.

A modular plug which would facilitate connection in the home has been disclosed and claimed in priorly issued U.S. Pat. No. 3,998,514 which was issued on Dec. 21, 1976 in the name of E. C. Hardesty and which is incorporated by reference hereinto. In that patent, a plastic plug body is provided with a plurality of partially seated terminals which are deployed for engagement with conductors of a cord which is inserted into the plug body. This is expedient inasmuch as it would be most inconvenient for a customer to manipulate relatively small, blade-like terminals into the plug body prior to their engagement with the cord conductors. The terminals are supported within the plug body spaced from conductor-receiving troughs so that the cord conductors may be inserted into the plug body after which the blade-like terminals are seated fully to establish electrical engagement with the cord conductors.

What is needed is a simple, inexpensive tool which may be marketed in a retail store and which will provide a customer, as well as the craftsperson, with the capability of making connections between telephone cordage or inside wiring and modular plugs. Such a tool seemingly is not available in the marketplace at the present time.

SUMMARY OF THE INVENTION

The foregoing problems have been overcome with a tool of this invention. The tool for terminating telephone cordage, as well as inside wiring, with modular plugs includes a housing having an opening at one end for receiving an end portion of a length of telephone cordage which is to be terminated with a modular plug, and a cavity at another end for receiving the modular plug. An impacting rocker, which is pivotally mounted in the housing such that opposite ends of the rocker alternately project above the housing during its use, has one end formed with jacket-cutting edges and an opposite end formed with terminal-insertion and plug-assembly tooling.

In using the tool, a customer inserts the end portion of a length of cordage, for example, into the opening at the one end and impacts the rocker adjacent that end to cause its edges to cut the cord jacket. Withdrawal of the cord causes the jacket to be stripped from the end portion thereof. The stripped end of the cordage with the individually insulated conductors of the cord being exposed is inserted into the body of a modular plug having partially inserted terminals and the plug is inserted into the cavity at the opposite end of the tool. Then the adjacent, opposite end of the rocker is impacted to cause the terminals to be seated fully within the plug and to engage electrically the exposed insulated conductors of the stripped end portion. This second impacting of the rocker also causes the tooling at that end of the rocker to move strain relief portions of the plug into engagement with the conductors and with the cord jacket. Should the tooling which actuates the strain relief portions engage the plug walls in a tight fit, the customer need only impact the one end of the rocker to cause a withdrawal of the tooling from the plug body.

BRIEF DESCRIPTION OF THE DRAWINGS

Other features of the present invention will be more readily understood from the following detailed description of specific embodiments thereof when read in conjunction with the accompanying drawings, in which:

FIGS. 1A and 1B are perspective views of a tool of this invention, taken from opposite ends thereof for receiving a modular plug and an end of telephone cordage that is to be terminated with the plug;

FIG. 2 is an elevational view in section of a modular plug having blade-like terminals partially inserted therein and having an end of a length of cordage inserted into a body of the plug;

FIG. 3 is an elevational view in section of the plug of FIG. 2 showing the modular plug after the blade-like terminals have been moved into engagement with the cord conductors and seated fully within the plug body;

FIG. 4 is a side elevational view of the tool which includes a housing and a pivotally mounted rocker with a portion of a sidewall of the housing being broken away to expose portions of the housing and of the rocker;

FIG. 5 is a plan view of the tool of this invention;

FIG. 6 is a a perspective view of the rocker of the tool of FIG. 1 in an inverted position;

FIG. 7 is a side elevational view of the pivotally mounted rocker;

FIG. 8 is a plan view of the pivotally mounted rocker as taken from the underside of FIG. 7;

FIG. 9 is an end view of a jacket-stripping end of the rocker of FIG. 7;

FIG. 10 is an enlarged plan view of a portion of the jacket-stripping end of the rocker;

FIG. 11 is a plan view of a housing of the tool to show a jacket-stripping end and a cavity;

FIG. 12 is an elevational view in section of the housing;

FIGS. 13A and 13B are end views in section of the jacket-stripping end of the rocker showing an end portion of a cord being disposed within a cord-entry opening and showing the location of the conductors after the cord has been moved to a jacket-cutting position;

FIG. 14 is a plan view showing an end portion of a cord disposed in the jacket-stripping end of the tool; and FIG. 15 is an enlarged plan view of a jacket-stripping portion of the housing.

DETAILED DESCRIPTION

Referring now to FIGS. 1A and 1B there are shown two perspective views of a tool from opposite ends thereof, the tool being designated generally by the numeral 20 and being used to attach a modular plug to an end of inside wiring or of telephone cordage. Such a tool may be used, for example, to attach modular plugs, which have been armed with terminals, to end portions of telephone cords. The terminated cords may be used to connect customer station equipment to a modular tricoupler such as that disclosed and claimed in priorly mentioned copending E. C. Hardesty U.S. application Ser. No. 442,931 which was filed on even date herewith.

Referring now to FIG. 2, there is shown a modular plug which is designated generally by the numeral 21 and which is used to terminate telephone cords 23, for example. The plug 21 is insertable into a jack such as that disclosed and claimed in U.S. Pat. No. 3,990,764 which issued on Nov. 9, 1976 in the name of C. L. Krumreich. One of the plugs 21—21 is inserted into one of the jacks assembled to the handset of the familiar telephone and the other plug is inserted into a jack in the base. The plug 21 has facilities for establishing electrical connections between a cord 23 and internal contacting telephone components of a telephone. A plug 21 is also assembled to each end of a line cord which extends from customer station equipment to a jack within the hereinbefore-mentioned modular tricoupler within a wall or on a baseboard molding of a room.

It is seen from the drawings that the cord 23 includes a jacket 24 which covers a plurality of insulated conductors 26—26. An endportion of each of the conductors 26—26 is to be connected to an associated one of a plurality of terminals 30—30 of the plug 21. Cordage which is terminated with the plugs 21-21 is shown, for example, in U.S. Pat. No. 4,090,763 which issued on May 23, 1978, in the names of W. I. Congdon et al.

A miniature plug 21 constructed in accordance with hereinbefore mentioned U.S. Pat. No. 3,998,514 permits the assembly of a cord end to dielectric portions of the plug body and then the expeditious seating of factory-assembled, partially seated blade-like terminals 30—30 in the housing. This avoids undue handling of the miniature terminals 30—40 in the field and the necessity for expensive equipment to form the terminals and to assemble them with the dielectric portion of the plug.

The terminals 30—30 provide the connection between the conductors 26—26 of the cord 23 and the external components in the telephone, for example. In a manufacturing environment, the terminals 30—30 are formed and then inserted into an already assembled cord and plug in an apparatus, for example, as disclosed in U.S. Pat. No. 3,839,787 issued Oct. 1974 in the names of W. B. Brown (now deceased) and F. D. Gavin. The tool 20 of this invention allows the terminal section and plug assembly to be done in the field.

Each one of the terminals 30—30 (see FIG. 2) is made from a flat strip of an electrically conductive resilient material such as, for example, Phosphor bronze alloy. The terminal 30 has a flat portion or side surface 31 with insulation-piercing tangs 33—33 protruding therefrom. The tangs 33—33 provide electrical connections between the conductive portion of the conductors 26-26 and the associated ones of the terminals. Each of the flat, blade-like terminals 30—30 also has curved crowns 34—34 of predetermined radii formed along an edge surface 36. The crown 34 nearest a free end of the plug 21 functions to complete the connection between the associated conductor 26 and an associated external-contacting component in the telephone jack. The edge surface 36 is plated with a corrosion-resistant metal, e.g. gold, and is smooth to prevent any abrading and removal of the gold from the contact wire of a jack which is engaged by the terminal 30.

Provisions are also made for seating properly the terminals 30—30 within the dielectric portion of the plug 21. Each of two opposed ends of the terminals 30—30 is formed with side edge surfaces 37—37 having necked-down portions 38—38. When the terminal 30 is inserted partially into the dielectric portion of the plug 21, the edge surfaces 37—37 penetrate the dielectric material to anchor the terminal in an armed position. The necked-down portions are used for piloting strips of terminals during their manufacture.

It should be apparent that the size of the terminals 30—30 and their attendant fragility precludes the use of pliers, for example, or other techniques used in prior art preassembled connectors, e.g. see U.S. Pat. No. 3,812,449, to make the final assembly with the cord 23. Moreover, the need to preserve the smooth corrosion-resistant covering along the edge surface 36 has brought on the use of blade insertion rams having polished contact surfaces.

The terminals 30—30 are partially assembled, in a manufacturing environment, to a plug body 40 (see FIG. 2) and shipped, for example, to field personnel for assembly to cords 23—23 and for the full seating of the terminals. In the field, a craftsperson, for example, uses the tool 20 of this invention to seat fully the terminals 30—30 in the body 40 of a plug 21 (see FIG. 3) and to assemble the plug body 40 to a cord 23 or to inside wiring.

The detailed construction of a preferred embodiment of the body 40 of a plug 21 is best shown in FIG. 2. The preferred body which is a unipartite is made from a rigid, dielectric plastic material. It has a free end 41, a cord-input end 42, and a terminal-receiving surface 43. It may be observed from the drawing that the plug body 40 includes a cord-input aperture 44 which opens to a cavity 46 that substantially encloses the entire end section of the cord which is inserted into the aperture 44. In a preferred embodiment, the cavity 46 terminates in a wall 47 adjacent a ledge 48 at the free end 41 of the plug body 40. Since in the preferred embodiment, the end wall 47 precludes the use of a ledge 48 of the plug body 40 as an anvil for conductor cut-off, the cord end must be stripped with some precision insofar as the length of jacket removed prior to insertion into the plug 21.

The plug body 40 is also constructed with conductor-receiving facilities which are dimensioned so that the conductors 26—26 therein cannot move laterally. This insures that the terminals 30—30 remain aligned with the conductors 26—26 during the insertion of the terminals. These facilities include a plurality of longitudinally extending troughs 49—49. The troughs 49—49 are constructed with flat bottom portions which provide bearing surfaces against which the terminals 30—30 may be driven. The bearing surfaces also provide substantial support for the associated conductors 26—26 to avoid undue lateral displacement and distortion thereof during terminal insertion. The tangs 33—33 of the fully inserted terminals 30—30 extend through the associated conductors 26—26 and become embedded in the trough bottoms.

The plug body 40 is formed with a plurality of spaced, parallel terminal-receiving slots 52—52 opening to spaces between separators 54—54. The slots 52—52 are aligned with associated ones of the conductor-receiving troughs 49—49 with each of the slots having a length slightly less than the overall length of that portion of the terminal 30 which is to be received therein. In this way, external contact components of the jack cavity into which the plug 21 is inserted are received between the associated separators 54—54 and guided into engagement with portions of the terminals 30—30.

The plug body 40 also includes facilities capable of being operated subsequent to insertion of an end portion of the cord 23, but prior to or simultaneously with the seating of the terminals 30—30, for providing strain relief for the cord jacket 24 and the conductors 26—26. The plug body 40 is constructed with a jacket-anchoring member 55 disposed within an opening 56 and connected to the plug 21 through a plastic hinge 57 oriented toward the free end 41 of the plug body. The jacket-anchoring member 55 is also connected to the plug body 40 toward the cord-input end 42 thereof by a frangible portion 58 of dielectric material. The frangible portion 58 supports the jacket-anchoring member 55 in its initial position to facilitate insertion of an end portion of a cord 23 into the cavity 46.

The jacket-anchoring member 55 also has a stop 59 formed centrally thereof. After actuation of the member 56, the stop 59 and a lip 60 of the plug body 40 cooperate to positively hold the jacket anchoring member in engagement with the plug body and the cord 23 to resist retrograde forces which are applied to the cord by the customer during use.

The plug body 40 also is formed with facilities to provide strain relief for the conductors 26—26. An opening 61 extends transversely across a portion of the plug body 40. A conductor-anchoring member in the form of a restraining bar 62 spans the opening with the ends of the bar spaced from end walls of the opening 61. A portion of the bar 62 is spaced from the plug body 40 by slots 63 and 64. The restraining bar 62 is integral with the walls of the opening 61 through connecting portions adjacent to the slots 63 and 64. The slot 64 is substantially longer than the slot 63 so that under application of forces by the tool 20, the bar is upset and reforms within the opening 61 to provide a generally headed strain relief element 68 (see FIG. 3) in engagement with the individual conductor 26—26. A portion of the wall adjacent the deeper slot 64 is distorted, partially torn from the plug body to form a fissure 69, and engaged under the wall of the opening 56 to lock the element in engagement with the conductors 26—26. The torn bar 62 is permanently deformed so that it does not return to its initial position upon the application of axial forces to the cord.

Formed integrally with the dielectric plug body 40 is a resilient locking tab 70 (see FIG. 3) which extends angularly from the plug body. A free end of the tab 70 extends beyond the cord-input end of the plug body 40 when the tab is in its non-depressed position. The locking tab 70 is connected by a plastic hinge to a nose 72 of the plug body 40. The nose 72 has a width which is less than that of the plug body 40 and is spaced from the side surfaces of the plug body by stepped recesses having faces 73—73. A portion of the tab 70 is stepped to form shoulders 75—75 having vertical latching surfaces 76—76 that are joined to surfaces 78—78 along edges 79—79.

Turning now to FIGS. 1A, 1B, 4 and 5, it can be seen that tool 20 for assembling a plug 21 to a cord 23 includes a housing and a rocker which are designated generally by the numerals 81 and 82, respectively. In a preferred embodiment, both the housing 81 and the rocker 82 are made of a rigid plastic material which is easily moldable. The rocker 82 is mounted pivotally within the housing 81 about a transversely extending pin 83. Of course, the rocker 82 and the housing 81 could be molded with dimples and depressions for receiving the dimples in a force fit to cause the rocker to be mounted pivotally in the housing.

Going now to FIGS. 6-8, it is seen that the rocker 82 includes a center section 84, a first end section 86 and a second end section 87. The first end section 86 cooperates with the housing 81 to strip the jacket from the end section of a cord 23 or of inside wiring, whereas the second section 87 cooperates with the housing 81 to seat the terminals 30—30 within the plug body 40 and to actuate the strain-relief facilities described hereinbefore.

The first end section 86 of the rocker 82 includes a slot 91 which communicates with a cavity 92 (see FIG. 8). The cavity 92 is effective to accommodate one end of the cord 23 which extends through the slot 91. The slot 91 includes cord-entry portion 93 (see FIG. 9) for receiving a cord end and a jacket-stripping portion 94. The cord-entry portion 93 of the slot 91 has a width which is slightly greater than the least outer dimension of the jacketed cord 23. In order to cut the jacket of the cord 23, the jacket-stripping portion 94 has a width which is only slightly greater than the outer diameter of one of the insulated conductors 26—26. Also, the jacket-stripping portion 94 includes opposed blade-like edges 96—96 (see FIGS. 9 and 10) which may be formed in a dished-out portion 97.

Viewing again FIGS. 6—8, it is seen that the second end portion 87 of the rocker 82 includes facilities designated generally by the numeral 100. These facilities are used to seat fully the terminals 30—30 within the plug body 40 and to assemble the plug 21 to a cord 23 or inside wiring by actuating the cord and conductor strain-relief portions of the plug body. The facilities include a plurality of precisely made and positioned blade-like rams 101—101 which are spaced apart to correspond to the spacing between the terminals 30—30 in the plug body 40. The facilities 100 also include a ram 102 which is sized to be received in the opening 56 in the plug body 40 so that it can cause the frangible portion 58 to be broken and urge the member 55 into engagement with the cord jacket. Adjacent to the ram 102 is a ram 104 which is dimensioned to enter the opening 61 of the plug body 40 to actuate the conductor-restraining bar 62. It should be observed from FIGS. 6-7 that the facilities 100 are secured within an opening 106 in the second end 87 of the rocker 82. As such, they are easily removed, when worn, and replaced.

The housing 81 in which the rocker 82 is mounted pivotally includes a cord-insertion end 111 (see FIG. 1B) and a plug-insertion end 112 (see FIG. 1A). The cord-insertion end 111 includes an opening 113 for receiving an end portion of a cord 23 or of inside wiring. For simplicity, the opening 113 will be referred to as a cord-receiving opening in an end surface 114 (see FIGS. 1B, 11 and 12) of the housing. The opening 113 has a width which is slightly larger than the least outer dimension of the cord 23 or inside wiring to be terminated with the tool 20 of this invention.

In order to cause the cord 23, for example, to be stripped, an end is inserted into the cord-receiving opening 113 of the housing 81 and aligned with the cord-entry portion 93 of the slot 91 of the rocker 82. This alignment exists when the rocker 82 is in a first position with its second end 87 in a depressed position within the housing 81. Then, when the first end section 86 of the rocker 82 is moved downwardly, the cord 23 is caused to enter the cord-entry portion 93 of the slot 91 of the rocker 82 (see FIG. 13A). Further pivotal movement of the rocker 82 into its second position with the first end section 86 fully depressed within the housing 81 causes the cord 23 to be moved into the jacket-stripping portion 94 of the slot 91 of the rocker (see FIGS. 13B and 14). As a result, the cord jacket 24 is cut by the opposing edges 96—96 the walls of the slot 91. When the cord end is withdrawn from the housing 81, the jacket 24 of the end portion is stripped to expose the individually insulated conductors 26—26.

As can well be imagined, the depression of the first end 86 of the rocker 82 to move the rocker into to its second position may cause the cord end which extends through the cord-receiving opening 113 of the housing to be turned downwardly. This movement of the cord 23 most probably would preclude its movement into the jacket-stripping portion 94 of the slot 91.

This problem is overcome by providing the housing 81 with a shelf 116 (see FIGS. 11, 12 and 15) for supporting the cord 23 during the cutting of its jacket. Viewing now the drawings, it is seen that the shelf 116 is generally I-shaped and includes two spaced portions 117 and 118 with a necked-down portion 119 therebetween. The necked-down portion 119 is dimensioned so that it is capable of being received in both the cord-entry and jacket-stripping portions 93 and 94, respectively, of the slot 91. When the cord end is inserted into the cord-receiving opening 113 of the housing 81, it is supported on the shelf 116. Then, when the rocker 82 is moved pivotally in a clockwise direction, as viewed in FIG. 4, to cause it to assume its second position, the cord-entry and jacket-stripping portions 93 and 94 of the cord-stripping slot 91 are caused to be moved over the cord which is supported in the shelf 116 and to straddle the necked-down portion 119. As can be seen in FIG. 14, this causes the opposing edges 96—96 to bite into and cut the cord jacket 24 of the end portion of the cord within the tool 20.

A user then applies forces to withdraw the end portion of the cord 23 from housing 81. This causes the jacket 24 at the end portion which has been cut by opposing edges 96–96 of the slot 91 to be held within the rocker 82. Relative movement is caused to occur between it and the remainder of the cord 23 to remove the jacket 24 from the end portion. The removed end portion of the jacket drops through the cavity 92 in the rocker 82 and an aligned opening 120 (see FIGS. 4 and 12) in the housing 81.

Turning now to the opposite end of the housing 81, which end is designated 112, it is seen that a jack cavity or plug nest 122 (see FIGS. 4 and 12) is formed therein. The nest 122, which is formed to receive a plug 21, includes internally formed surfaces which cooperate with the shoulders 75—75 of the tab 70 of the plug to lock the plug within the housing 81. It will be observed from the drawings that the rocker 82 is formed so that its second end 87 is substantially shallower than the first end 86. This allows the rams 101, 102 and 104 to protrude therefrom and to be brought into engagement with the plug in the nest 122.

Going now to the nest 122, it is seen that sidewalls 123 and 124 (see FIG. 1A) each are formed to include an abutment 131 (see FIG. 12) having a vertical face 132. The vertical face 132 intersects a first ledge 133 on each side of the nest 122 which extends to the open end of the nest. A second ledge 134 which is closer to an outwardly facing surface 136 of the base of the housing than the ledge 133 extends to a surface 137 to which the nest 122 opens. A ceiling 138 is spaced from the ledges 133-133 a distance which is substantially equal to the distance between the surfaces that defines the height of the plug body 41.

Internal surfaces of the housing 81 which define the nest 122 must also include provisions for holding a plug 21 within the cavity to secure it within the housing during the seating of the terminals. Such provisions are found in other modular plug connection devices. The nest 122 is similar to the cavity at each end of a coupler jack for telephone cords shown in U.S. Pat. No. 4,268,109 which issued on May 19, 1981 in the name of E. C. Hardesty and which is incorporated by reference hereinto. As seen in FIG. 12, these provisions include a step 139 in each internally formed ledge 134. This allows the resilient tab 70, which is deflected toward the underside of the plug body 41 to form an arcuate shape so that the plug 31 can be moved slidably in engagement with the side ledge surfaces 133—133 during insertion of a modular plug 21, to spring-return to a normal position. The shoulders 75—75 move slidably in engagement with other side ledge surfaces which define the cavity. Just prior to full insertion of the plug 31, portions of the shoulders clear the stepped portion. This allows the arched tab 70, after being released, to resume its original orientation because of its resilience. This causes the free end of the tab to be urged downwardly. Shoulders 75—75 of the locking tab engage behind the steps 139—139 to prevent inadvertent removal of the plug 21 from the nest 122. An arrangement using ledges having interrupted portions also is shown in allowed application Ser. No. 241,951 which was filed Mar. 9, 1981, now U.S. Pat. No. 4,379,609 issued Apr. 12, 1983 in the name of E. C. Hardesty and which is incorporated by reference hereinto.

The nest 122 communicates with a chamber 141 (see FIG. 12) of the housing through a passage 142 (see FIGS. 4 and 12). The passage 142 is aligned with the facilities 100 of the rocker 82. A wall of the passage 142 which is oriented toward the center of the housing 81 is formed with a plurality of vertically extending ribs 143—143 (see FIGS. 11 and 12) which define a plurality of slots 144—144. When a plug 21 armed with terminals 30—30 is inserted into the nest 122, forward portions of the terminals are received in the slots 144—144. This steadies the terminals 30—30 and maintains them in alignment with the rams 101—101 of the rocker 82.

After the jacket 24 has been removed from an end portion of the cord 23, the stripped end portion with the individually insulated conductors 26-26 being exposed is inserted into the aperture 44 at one end of a modular plug 21. Then the plug 21 is inserted into the nest 122 of the housing 81. During insertion, the tab 70 is depressed against the underside of the plug body 40 until the free end 41 engages the vertical surface 132 of the abutment 131 and the shoulders 75—75 clear the step 139 inside the nest. At that time, the tab 70 returns to its original position and the shoulders 75—75 lock the plug 21 in the housing nest 122. When the plug 21 is secured within the nest, the partially seated terminals 30—30 (see FIG. 2) are aligned in planes with the rams 101—101 of the rocker 82. Also, the leading ends of the terminals are disposed in the slots 144—144 and are thereby supported laterally.

Then the rocker 82 is moved to its first position by depressing its second end section 87 and causing it to move pivotally in a counterclockwise direction as viewed in FIG. 4 about the pin 83. This causes the rams 101—101, 102 and 104 to be moved into the passage 142. The rams 101—101 engage the partially seated terminals 30—30 and move them into engagement with the cord conductors 26—26. Their tangs 33—33 become embedded in the floors of the conductor-receiving troughs 49—49 when the terminals are fully seated in the plug body 40. Also, the rams 102 and 104 of the rocker enter the openings 56 and 61, respectively, of the plug body 40 and move the strain relief portions 55 and 62 into their operative positions as shown in FIG. 3.

The user then applies forces to the first end 86 of the rocker 82 to move it pivotally to disengage the second end 87 from the plug 21 to permit its removal from the housing 81.

The nest 122 of the housing 81 is arranged to allow a user to easily remove the plug 21 after it has been attached to the cord. The free end of the tab 70 of the plug 21 extends beyond the surface 137 of the housing 81 to permit its digital depression so that is reassumes the arched configuration of entry. The nest 122 is formed so that the plug body 40 is in proximate engagement with the ceiling 138 and the ledges 133—133. Following termination of the cord 23 with the plug 21, the depression of the tab 70 moves the shoulders 75—75 a distance so that the surfaces 78—78 are disposed substantially at the level of the ledges 133—133 to permit withdrawal of the plug from the nest 122.

It is to be understood that the above-described arrangements are simply illustrative of the invention. Other arrangements may be devised by those skilled in the art which will embody the principles of the invention and fall within the spirit and scope thereof.

What is claimed is:

1. A tool for terminating a flat cord, comprising a planar array of individually insulated conductors enclosed in a jacket having parallel sides and generally semi-circular ends, with a modular plug to connect electrically the conductors with terminals of the plug, said tool comprising:

a housing which includes a cord-receiving opening at one end and a plug-receiving nest at another end, said housing adapted to be supported and having a supporting surface at said one end to support an end portion of a cord stationary with respect to the housing, the cord-receiving opening of said housing having a width which is slightly greater than the least outer dimension of the cross-section of a cord which is to be inserted into the cord-receiving opening, and said housing including a plurality of ribs which extend into said plug-receiving nest to form a plurality of slots therebetween for receiving terminals which are partially seated in a plug when the plug is received in the nest to align and support the terminals; and a rocker which is mounted pivotally centrally between the ends in said housing for movement between a first position where it is adapted to cut the cord jacket and a second position where it is adapted to cause the terminals to be inserted into the plug, said rocker having a first end which is adjacent to said cord-receiving opening and which includes cutting means having cutting edges that are spaced apart a fixed distance which is slightly greater than the outer diameter of each of the insulated conductors for cutting an end portion of a jacket of a cord that is inserted into said cord-receiving opening of said housing to facilitate stripping of the end portion, and a second end which is adjacent to said nest and which include terminal-inserting means for moving terminals that have been partially seated in a body of the plug into engagement with the conductors of the cord, and means for moving portions of the plug body into engagement with the cord jacket and the conductors to secure the plug to the cord, the cutting means in said first end of the rocker including a slot having a cord-entry portion and a jacket-stripping portion, the cord-entry portion being aligned with the cord-receiving opening of the housing when the rocker is in a first position, and the stripping portion of the slot of the rocker straddling a portion of the supporting surface as the rocker is moved into its second position, the supporting surface cooperating with the first end of the rocker during movement to cause the jacket-stripping portion of the slot to be moved into engagement with the jacket of the stationary, supported cord; and wherein said terminal-inserting means of said rocker includes a plurality of spaced rams which are aligned with the partially seated terminals when the plug is inserted into the plug-receiving nest, the terminal-inserting means at the other end of the housing being in an inoperative position when the rocker is in the second position to allow a plug to be inserted into the cavity, and in an operated position when forces are applied to the second end of the rocker to move it into the first position, the central pivotal mounting of said rocker being effective to allow a plug having partially seated terminals to be inserted into said nest in the housing when the first end of the rocker is moved from the first position to cut the jacket of the cord which is stationary on the supporting surface, and to allow a cord end portion to be inserted into said cord-receiving opening when said rocker has been moved to the first position to cause said second end of said rocker to cause said rams to seat the terminals.

2. The tool of claim 1, wherein said jacket-stripping portion of said slot of said rocker has a width which is slightly greater than the outer diameter of the cross-section of an insulated conductor of a cord which is to be inserted into said cord-receiving opening of said housing, and said cord-entry portion has a width which is slightly greater than the least outer dimension of the cross-section of a cord that is inserted into said cord-receiving opening.

3. The tool of claim 2, wherein said jacket-stripping portion of said slot of said rocker includes opposed edges which are effective to cut the jacket of an end portion of the cord in said jacket-stripping portion when forces are applied to said first end of said rocker to move said rocker into a second position, and which are effective to remove the jacket from the end portion of the cord in said rocker when forces are applied to the cord to remove the end portion from said tool.

4. The tool of claim 1, wherein said rocker includes a cavity which communicates with said slot and which accommodates an end of a cord which is inserted into said one end of said housing and said housing includes an opening therethrough which is aligned with said cavity of said rocker to allow the jacket removed from the end portion of the cord to drop from said tool.

* * * * *